US006757165B2

(12) United States Patent
Fujiki et al.

(10) Patent No.: US 6,757,165 B2
(45) Date of Patent: Jun. 29, 2004

(54) FUNCTION EXPANDING DEVICE FOR ELECTRONIC HARDWARE

(75) Inventors: Tatsuya Fujiki, Kawasaki (JP); Tomonori Hatano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/477,405

(22) Filed: Jan. 4, 2000

(65) Prior Publication Data

US 2003/0095379 A1 May 22, 2003

(30) Foreign Application Priority Data

Jan. 25, 1999 (JP) ............................................ 11-015758

(51) Int. Cl.⁷ ................................................. G06F 1/16
(52) U.S. Cl. ...................... 361/686; 439/638; 439/651; 710/303
(58) Field of Search ................................ 341/683–686; 439/928.1, 638, 652, 133, 650, 651, 653, 654; 76/303, 304

(56) References Cited

U.S. PATENT DOCUMENTS

| 4,788,658 | A | * | 11/1988 | Hanebuth | .................... | 361/686 |
| 5,030,128 | A | * | 7/1991 | Herron et al. | ............... | 361/686 |
| 5,126,954 | A | * | 6/1992 | Morita | ........................ | 361/683 |

(List continued on next page.)

FOREIGN PATENT DOCUMENTS

| EP | 0 278 133 | | 2/1987 | | |
| EP | 0 793 164 A2 | | 9/1997 | | |
| EP | 987619 A2 | * | 3/2000 | ............. | G06F/1/16 |
| JP | 63-080313 | | 4/1988 | | |
| JP | 63-259708 | | 10/1988 | | |
| JP | 4-205328 | | 7/1992 | | |
| JP | 5-66864 | | 3/1993 | | |
| JP | 5-197446 | | 8/1993 | | |
| JP | 6-75661 | | 3/1994 | | |
| JP | 6-102968 | | 4/1994 | | |
| JP | 6-162754 | | 6/1994 | | |
| JP | 6-250762 | | 9/1994 | | |
| JP | 7-200176 | | 8/1995 | | |
| JP | 7-295679 | | 11/1995 | | |
| JP | 8-095668 | | 4/1996 | | |
| JP | 9-311736 | | 12/1997 | | |
| JP | 9-330152 | | 12/1997 | | |
| JP | 10-39945 | | 2/1998 | | |
| JP | 10-116133 | | 5/1998 | | |
| JP | 10-260602 | | 9/1998 | | |
| JP | 10-340136 | | 12/1998 | | |
| JP | 11-110081 | | 4/1999 | | |

OTHER PUBLICATIONS

Search Report dated Jun. 23, 2003 for related EP application.
IBM Technical Disclosure Bulletin, vol. 34, No. 2, Jul. 1991.
Final Office Action, dated May 31, 2002, for corresponding Japanese Application No. 11–015758 with English translation.
Office Action for corresponding Japanese Application No. 11–015758 with English translation.
Product Catalog of DynaBook TECRA 8000, Issued Oct. 1998 by Toshiba Corporation.
Product Catalog of Notebook Computer MBC–G1/G1F, Issued Oct. 1998 by Sanyo Electric Corporation.

(List continued on next page.)

Primary Examiner—Lisa Lea-Edmonds
(74) Attorney, Agent, or Firm—Staas & Halsey LLP (57) ABSTRACT

The present invention has an object to provide a function expanding device which may render electronic hardware multifunctional, light, small, and easy to operate. The function expanding device of the present invention includes a first connection part connectable to a unit that expands a function of the electronic hardware, a second connection part connectable to the electronic hardware, and an operation part for the unit.

13 Claims, 7 Drawing Sheets

U.S. PATENT DOCUMENTS

| | | | |
|---|---|---|---|
| 5,132,871 A | * 7/1992 | Densham et al. | 361/686 |
| 5,153,817 A | * 10/1992 | Hosoi et al. | 361/686 |
| 5,227,953 A | * 7/1993 | Lindberg et al. | 361/686 |
| 5,459,637 A | 10/1995 | Ma et al. | |
| 5,460,547 A | * 10/1995 | Belt et al. | 439/638 |
| 5,475,271 A | 12/1995 | Shibasaki et al. | |
| 5,664,118 A | 9/1997 | Nishigaki et al. | |
| 5,687,387 A | 11/1997 | Endejan et al. | |
| 5,801,922 A | * 9/1998 | Shen et al. | 361/686 |
| 5,805,412 A | * 9/1998 | Yanagisawa et al. | 361/686 |
| 5,930,110 A | 7/1999 | Nishigaki et al. | |
| 5,959,835 A | * 9/1999 | Dohi et al. | 361/686 |
| 6,049,452 A | * 4/2000 | You et al. | 361/685 |
| 6,052,279 A | * 4/2000 | Friend et al. | 361/686 |
| 6,064,566 A | * 5/2000 | Agata et al. | 361/684 |
| 6,073,187 A | * 6/2000 | Jacobs et al. | 361/683 |
| 6,134,376 A | * 10/2000 | Lee et al. | 361/685 |
| 6,353,533 B1 | * 3/2002 | Ganthier et al. | 361/683 |
| 6,509,981 B1 | * 1/2003 | Shih | 361/686 |
| 2002/0008497 A1 | * 1/2002 | Tanaka et al. | 320/128 |

OTHER PUBLICATIONS

Product Catalog of Subnotebook PC Let's note/S51 CF–S51J8, Issued Nov. 1998 by Matsushita Electric Industrial Col., Ltd., Panasonic Computer Company.

FMV–BIBLO NSVIII23X SMV Body and Option Guide (B3FH–4571–01–00) Issued Nov. 1998 by Fujitsu Limited.

U.S. patent application Ser. No. 09/283,307, filed Apr. 1, 1999.

U.S. patent application Ser. No. 08/885,857, filed Jun. 30, 1997.

* cited by examiner

PRIOR ART

FUNCTION EXPANDING DEVICE FOR ELECTRONIC HARDWARE

BACKGROUND OF THE INVENTION

The present invention relates to attachments that are connectable to electronic hardware, such as a notebook personal computer ("PC") and expands their functions.

The recent development and spread of notebook PCs have been increasingly demanding a notebook PC that is light for portability purposes and multifunctional on a desk. The PC body itself is thus made light, whereas various expansion or extension units, such as a CD-ROM drive and a floppy disc drive, connectable to or built it have been proposed.

However, the conventional expanding units, such as a CD-ROM drive, if built in the computer body would bulk up the body and deteriorate its portability. Those drives which are different in specification, such as a CD-ROM drive and a high density floppy disc (LS-120), use different connectors for connection with the PC body. An attempt to expand a notebook PC with multiple functions (or specifications) would thus need a plurality of connectors accordingly, which prevents a realization of a miniature PC body. In other words, a conventional notebook PC cannot include multiple connectors in order to realize the miniaturization, and thus it cannot become multifunctional. Moreover, as a CPU in the PC body controls a CD-ROM drive (or a music compact disc ("CD") drive), listening to a music CD arduously needs run application software that is installed in the PC body. This operation handles time-consuming and not easy.

Figure 9:
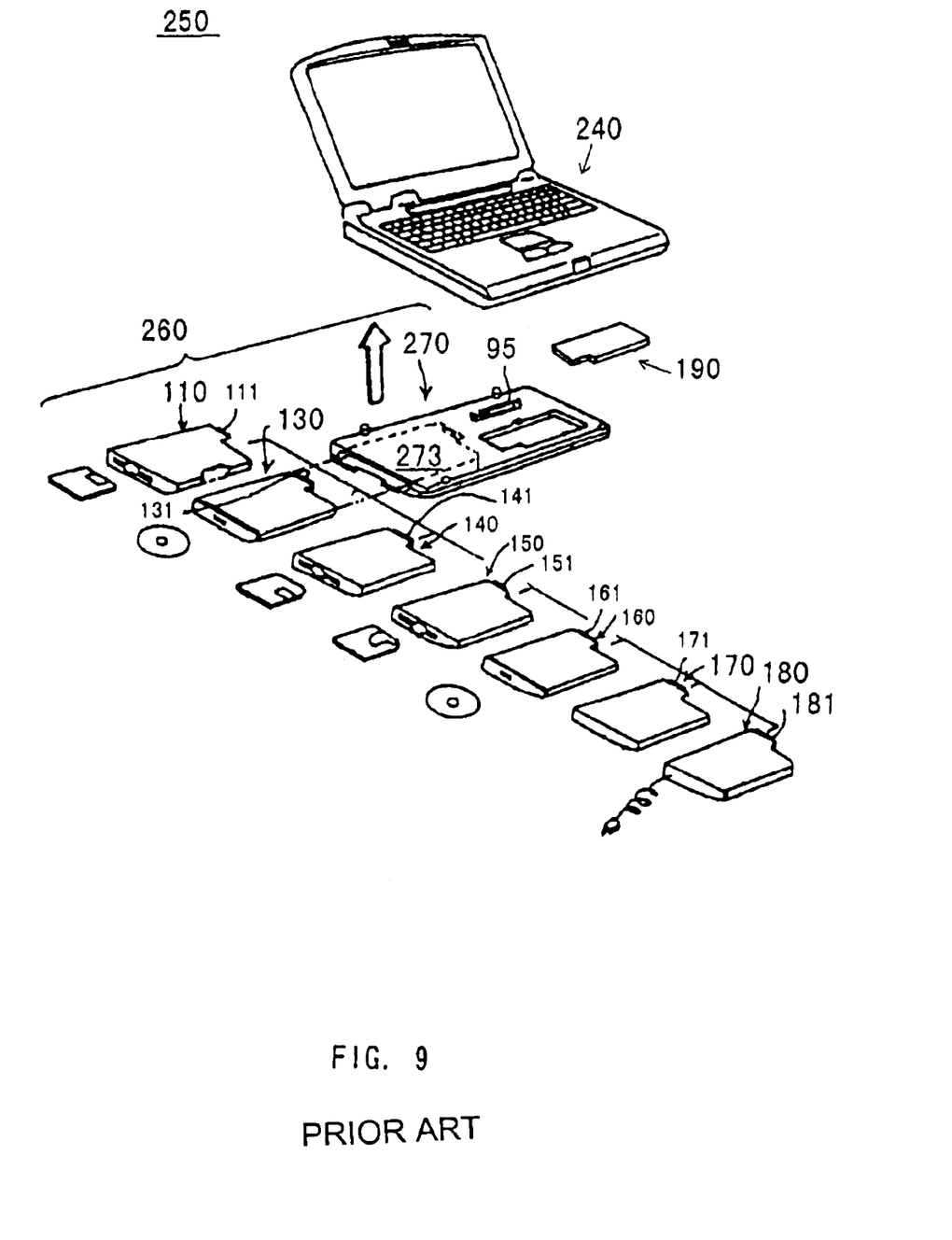
FIG. 9 is a function expanding device disclosed in a prior patent application filed by this applicant.

Accordingly, the assignee filed Japanese Patent Application No. 10-260602 entitled "function expanding device, component unit, and electronic hardware" on Sep. 14, 1998. FIG. 9 shows notebook PC related attachment group 250 and notebook PC 240.

The notebook PC related attachment group 250 includes bay housing 270, floppy disc drive ("FDD") 110, CD-ROM drive 130, magneto-optical ("MO") disc drive 140, high density floppy disc 150, digital video disk ("DVD") drive 160, hard disc drive ("HDD") 170, AC/DC adapter 180, and battery pack 190. The FDD 110, CD-ROM drive 130, MO disc drive 140, high density floppy disc drive 150, DVD drive 160, and HDD 170 each constitute an expanding unit.

Function expanding unit 260 for a notebook PC is made by attaching the battery pack 190 to the bay housing 270 and inserting one of the FDD 110, CD-ROM drive 130, MO disc drive 140, high density floppy disc drive 150, DVD drive 160, HDD 170 and AC/DC adapter 180. There are eight modes and its extensity is wider than the conventional. This notebook-PC function expanding unit 260 is attached to the bottom of the notebook PC 240. The notebook-PC function expanding unit 260 serves as a charger for the battery pack 190, and as a rack for the notebook PC 240. When the notebook-PC function expanding unit-260 is attached to the notebook PC 240, the notebook PC 240 and the notebook-PC function expanding unit 260 are electrically connected to each other, expanding a function of the notebook PC 240.

The bay housing 270 has bay 273 as a storage part. The bay 273 is a flat space corresponding to an outer shape of the FDD 110, etc., and has an opening into which the FDD 110 or the like is inserted.

As shown in FIG. 9, the above devices 110, 130, 140, 150, 160, 170 and AC/DC adapter 180 have approximately similar flat outer shape that may be inserted into and corresponds to the bay 273 in the bay housing 270, and include connectors 111, 131, 141, 151, 161, 171, and 181 at the same top position in the insertion direction.

As shown in FIG. 9, the floppy disc drive 110 has an outer shape that may be inserted into and corresponds to the bay 273, and includes connector 111 at the top in the insertion direction.

The connectors 111, 131, 141, 151, 161, 171, and 181 at the side of each expanding unit are connected to connector 295 (not shown) in the bay housing 270. The connector 295 in the bay housing 270 is connected to a connector (not shown) at the bottom of the notebook PC 240. In this way, the bay housing 270 enables various expanding units to be connected to the notebook PC 240 while making light the body of the notebook PC 240 and reducing the number of connectors in the notebook PC.

The computer body 240 controls the FDD 110, CD-ROM drive 130, MO disc drive 140, high density floppy disc drive 150, DVD drive 160, HDD 170, etc. Control by the CPU in the PC body over the CD-ROM drive (or CD drive) etc., needs arduously run application software installed in the PC body even in an attempt to listen to a music CD. This operation handles time-consuming and not easy. More specifically, where the computer body 240 operates the expanding unit, a user may feel that running of the PC and control over fast-forwarding and positioning at the head of a desired tune using PC's application software interface are harder than operations of the ordinary audio equipment. General CD performance software for PCs indicates on a PC display the way of operations for an operation part on a CD player and requires a user to input a desired performance button etc. on the indicated operational part by using a pointing device, such as a mouse. This CD performance means has a disadvantage in that a user should await a period of time for PC and software activations. A tune designation in a CD needs an interface using a mouse or other input means on the PC, and the way of operation becomes disadvantageously different between the PC and the ordinary audio equipment. This exemplifies a CD, but similar disadvantages are seen for DVD drives and other peripherals.

In an attempt to connect a new expanding unit (for example, a supplemental storage) to a computer body, the function expanding device (or the bay housing 270) should be altered accordingly.

Before another expanding unit having a different specification is connected to a computer body, a specification of the function expanding device and a specification of a connection part (the connector 295 in FIG. 9) should be redesigned. In other words, the specification for the connector 295 in FIG. 9 is determined so as to correspond to the expanding units 110, 130, 140, 150, 160, 170 and 180. An addition of an expanding unit having a different specification would thus require a change of a specification for the connector 295. The conventional example in FIG. 9 connects the connector 295 directly to the computer body 240 and integrate them as one member, but it is conceivable to connect them using a cable. In this case, an addition of an expanding unit having a different specification thus requires a change of cable's specification (such as the number of signal lines). These design and specification changes increase the number of development steps of the entire apparatus and thus the development cost. Although new peripherals for PCs are more and more developed, a connection of these peripherals to the notebook PC 240 via the function expanding device (or bay housing 270) would increase the design and specification changes.

BRIEF SUMMARY OF THE INVENTION

Therefore, it is an exemplified general object of the present invention to provide a novel and useful function expanding device in which the above disadvantages are eliminated.

Another exemplified and more specific object of the present invention is to provide a function expanding device that renders electronic hardware multifunctional, small, light, and easy to use.

In order to achieve the above objects, a function expanding device stated in claim 1 comprises a first connection part connectable to a unit which expands a function of electronic hardware, a second connection part connectable to the electronic hardware, and an operation part for the unit. This function expanding device enables the unit to be operated not only by the electronic hardware but also by an operational part in the function expanding device.

The function expanding device stated in claim 2, depending upon claim 1, may further comprise a control part which may control the unit independent of the electronic hardware. For example, when the electronic hardware has a speaker and the unit is a CD-ROM drive that may reproduce both a music CD and a CD-ROM, the control part of the function expanding device may control the reproduction of the music CD independent of the electronic hardware.

According to the function expanding device stated in claim 3 that depends upon claim 1, the operation part may power on at least part of the electronic hardware. For example, when the electronic hardware has an amplifier that amplifies an audio signal in a music CD, the operation part may transmit the power-on signal to the amplifier. Thus, for example, even when the power-on signal is not supplied to the amplifier after the application in the electronic hardware runs, if power is supplied to the electronic hardware (by an AC adapter or a battery) the control part of the function expanding device may control the amplifier in the electronic hardware.

According to the function expanding device stated in claim 4 that depends upon claim 2, the control part may transmit operational information of the operation part to the electronic hardware. Thus, for example, the operational information of the operation part may reflect on and synchronize with application software in the electronic hardware.

According to the function expanding device stated in claim 5 that depends upon claim 1, the second connection part is connectable to a port replicater, and connectable to the electronic hardware via the port replicater. The second connection part may thus be connected indirectly to the electronic hardware.

According to the function expanding device stated in claim 6 that depends upon claim 1, the second connection part may have a cable. Therefore, this electronic hardware may be made smaller than the electronic hardware that has an internal connector.

According to the function expanding device stated in claim 7 that depends upon claim 1, the function expanding device may further comprise a display part which displays a status of the unit and enables a user of the function expanding device to confirm the operation. In particular, this function expanding device is suitable when only the control part of the function expanding device controls the unit without using the display part (for example, a LCD) in the electronic hardware.

According to the function expanding device stated in claim 8 that depends upon claim 1, the unit is selected from a group including a music CD drive, a CD-ROM drive, a DVD-ROM drive, and an LS-120 drive, and the first connection part has a bay structure connectable compatibly to either drive in the group. Therefore, the electronic hardware need not conveniently have a connection part for each unit drive and may become multifunctional and miniature.

According to the function expanding device stated in claim 9 that depends upon claim 1, the second connector may have an IDE and music interfaces. Therefore, the electronic hardware may correspond to a unit pursuant to these interfaces and become multifunctional.

A port replicater stated in claim 10 that is connectable to a function expanding device which includes a first connection part connectable to a unit which expands a function of electronic hardware, a second connection part connectable to the electronic hardware, and an operation part of the unit, comprises a third connection part connectable to the second connection part of the function expanding device, and a fourth connection part connectable to the electronic hardware. This port replicater is novel in comparison with a conventional port replicater in having the third connection part connectable to the second connection part of the function expanding device.

A function expanding device stated in claim 11 comprises a first connection part connectable selectively to a plurality of units each of which expands a function of electronic hardware, a second connection part connectable to the electronic hardware, and a third connection part connectable to the electronic hardware. This function expanding device is novel in having two connection parts.

In the invention stated in claim 11, as an example, the second connection part in this function expanding device connects to the electronic hardware a unit which has been able to be connected to the function expanding device. On the other hand, the third connection part connects to the electronic hardware the unit designed to be newly connected to it.

An attempt to connect a newly introduced unit and a conventionally expandable unit to the electronic hardware by one connection part would necessarily alter a conventional connection part for connection with the electronic hardware. In contrast, according to the above structure stated in claim 11, the third connection part connects the newly introduced unit to the electronic hardware without changing the design of the connection part in the electronic hardware, whereas the second connection part serves as a connection part between the conventionally connectable unit and electronic hardware. It is therefore sufficient to design only the third connection part for the additional unit. The reduction of the number of development steps for the entire apparatus and the appropriation of the conventional equipment would reduce the development cost. Instead, the third connection part may connect the conventionally connectable unit to the electronic hardware while the second connection part may connect to the electronic hardware the newly introduced unit designed to be connected to it. When the unit group is divided into the second and third connection parts, the number of units for each connection part becomes reduced in comparison with that where only one connection part handles all the units. When the connection part is a connector or a cable, the number of signal lines reduces and becomes small.

In the function expanding device stated in claim 12 that depends upon claim 11, these second and third connection parts may be used to connect to the electronic hardware those units connectable to the first connection part, but different with each other. The second connection part may be used to connect to the electronic hardware at least one of said plurality of units connectable to the first connection part, and wherein the third connection part may be used to connect to the electronic hardware at least one of the units connectable to the first connection part, which unit is different from the unit connected by the second connection part.

In the invention stated in claim 12 or 13, as an example, the second connection part connect to the electronic hardware the unit that has been connectable to the function expanding device in the conventional structure, while the third connection part connect to the electronic hardware the unit designed to be newly connected to it.

An attempt to connect a newly introduced unit and a conventionally expandable unit to the electronic hardware by one connection part would necessarily alter a conventional connection part to the electronic hardware. In contrast, according to the above variations stated in claim 12 or 13, the third connection part connects the newly introduced unit to the electronic hardware without changing the design of the connection part in the electronic hardware, whereas the second connection part serves as a connection part between the conventionally connectable unit and electronic hardware. It is therefore sufficient to design only the third connection part for the additional unit. The reduction of the number of development steps for the entire apparatus and the appropriation of the conventional equipment would reduce the development cost.

Instead, the third connection part may connect the conventionally connectable unit to the electronic hardware while the second connection part may connect to the electronic hardware the newly introduced unit designed to be connected to it. The second and third connection parts handle different units, and the number of units for each connection part becomes reduced in comparison with that where only one connection part handles all the units. When the connection part is a connector or a cable, the number of signal lines reduces and becomes small.

Other objects and further features of the present invention will become readily apparent from the following description of the embodiments with reference to accompanying drawings.

DETAILED DESCRIPTION OF INVENTION

Figure 1:
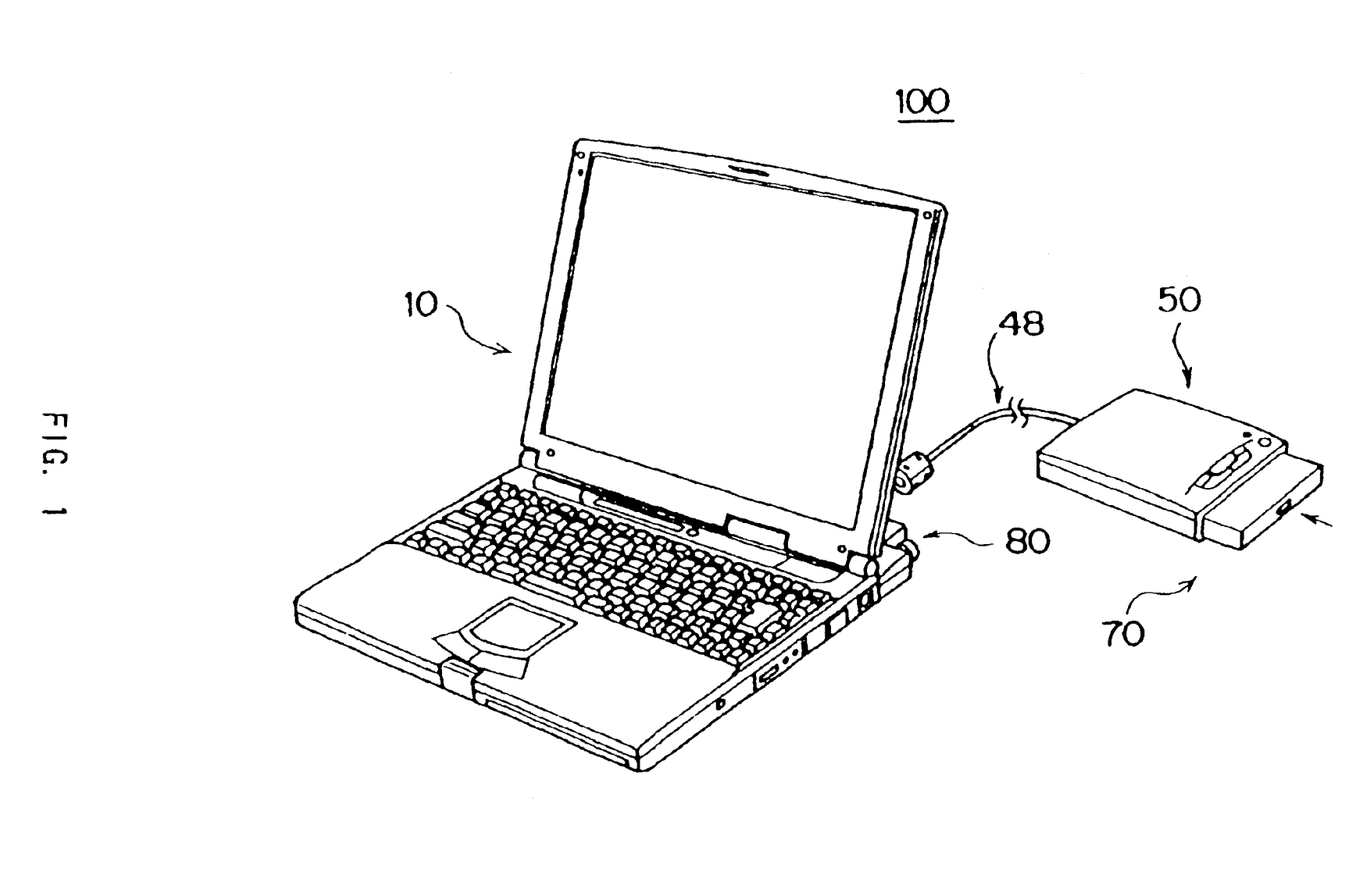
FIG. 1 is a schematic perspective view of a computer system of the present invention.
Figure 2:
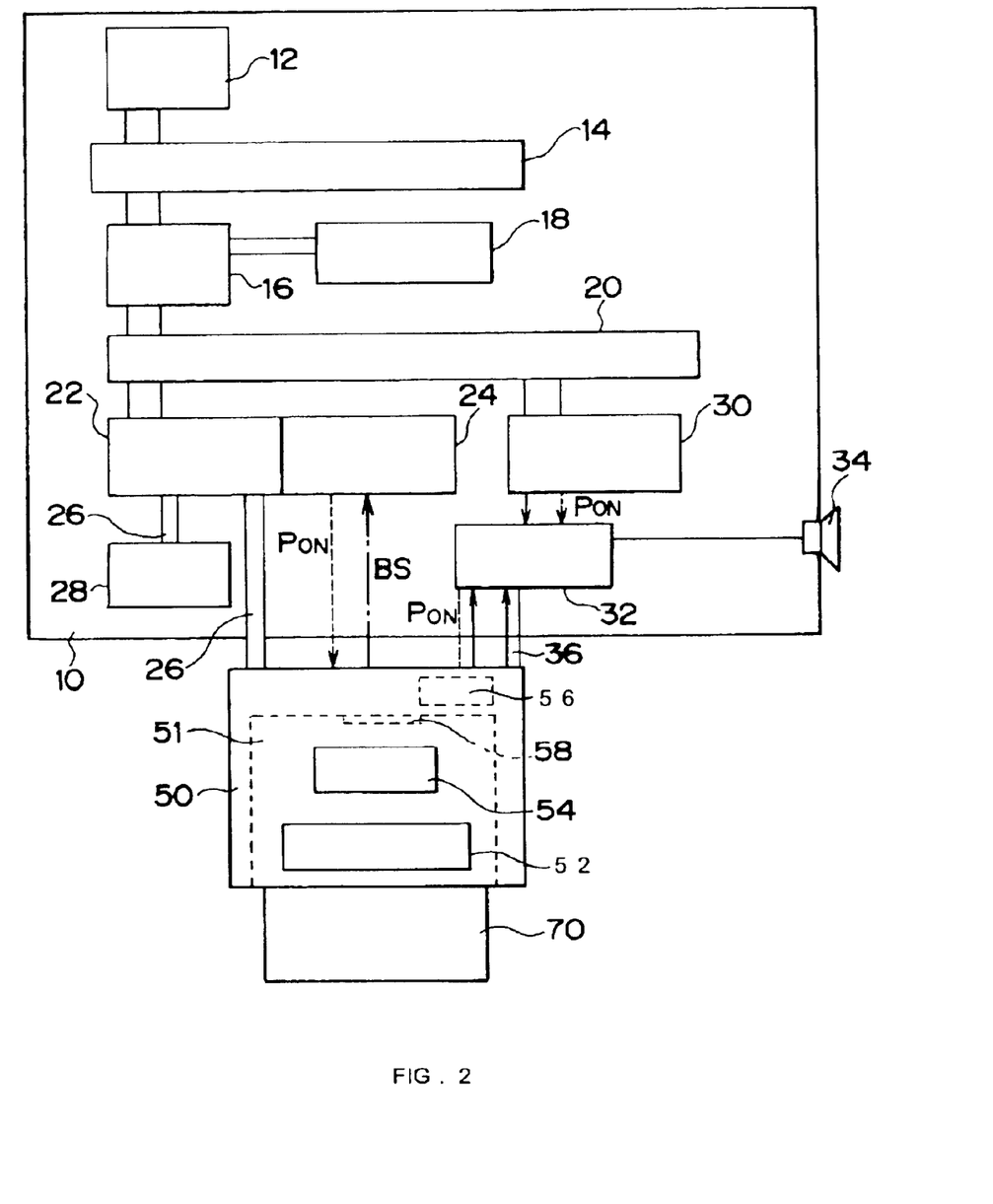
FIG. 2 is an exemplified block diagram of the computer system shown in FIG. 1.

A description will now be give of computer system 100 according to the present invention, with reference to FIGS. 1 and 2. FIG. 1 is a schematic perspective view of the computer system 100, and FIG. 2 is a block diagram thereof. As shown in FIG. 1, the computer system 100 of the present invention includes notebook PC 10, cable 48, function expanding device (bay attachment) 50, expanding unit 70, and port replicater 80.

The present invention is not limited to notebook PCs, but applicable to so-called laptop PCs, portable PCs, and mobile PCs.

Referring to FIG. 1, the notebook PC 10 may employ any structure known in the art, and install a mouse, trackball, joystick, etc. The notebook PC 10 is connected to the external power source via an AC adapter or a detachable lithium battery. The notebook PC 10 is a typical example of electronic hardware, but the electronic hardware to which the present invention is applicable is not limited to this type.

Although this embodiment describes using a data processor, such as notebook PCs, laptop PCs, portable PCs, and mobile PCs, the present invention is applicable, in addition to so-called computer, to personal digital assistances ("PDAs"), electronic notebooks, etc. Moreover, the present invention and embodiment are not limited to data processors, but other electronic hardware. For example, the bay attachment 50 may be directly connected to a speaker and a headphone in order to reproduce a music CD.

Referring to FIG. 2, the notebook PC 10 includes CPU 12, host bus 14, chip set (440DX) 16, memory 18, PCI bus 20, IDE controller 22, bay controller 24, IDE interface 26, internal HDD 28, source circuit 30, amplifier 32, speaker 34, and music interface 36. The CPU 12 controls an operation of each hardware and software, and may communicate via the host bus 14 the chip set 16 and memory 18, such as a RAM. Necessary programs are downloaded to the memory 18 from the HDD 28. The CPU 12 is connected to the IDE controller 22, bay controller 24 and source circuit 30 via the PCI bus 20. The IDE controller 22 transmits an instruction in accordance with the software stored in the HDD 28 to the bay attachment 50 under control by the CPU 12. The bay controller 24 transmits a power-on signal to the bay attachment 50 and expanding unit 70 connected to it.

Figure 6:
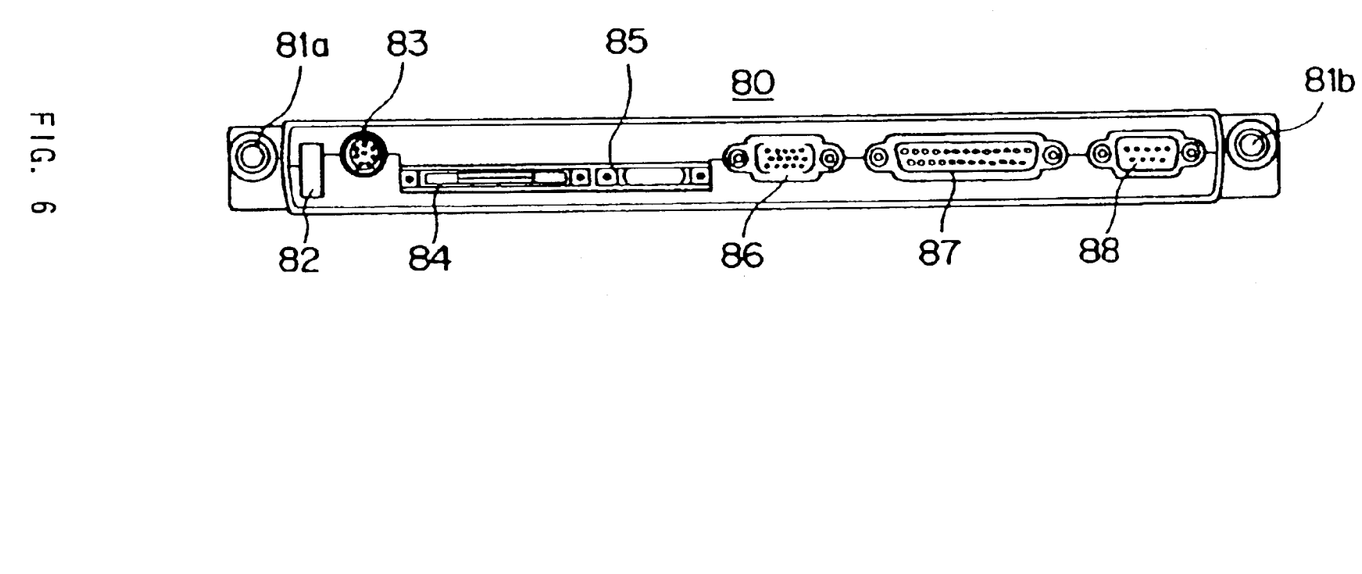
FIG. 6 is a rear view of the port replicater shown in FIG. 1.
Figure 7:
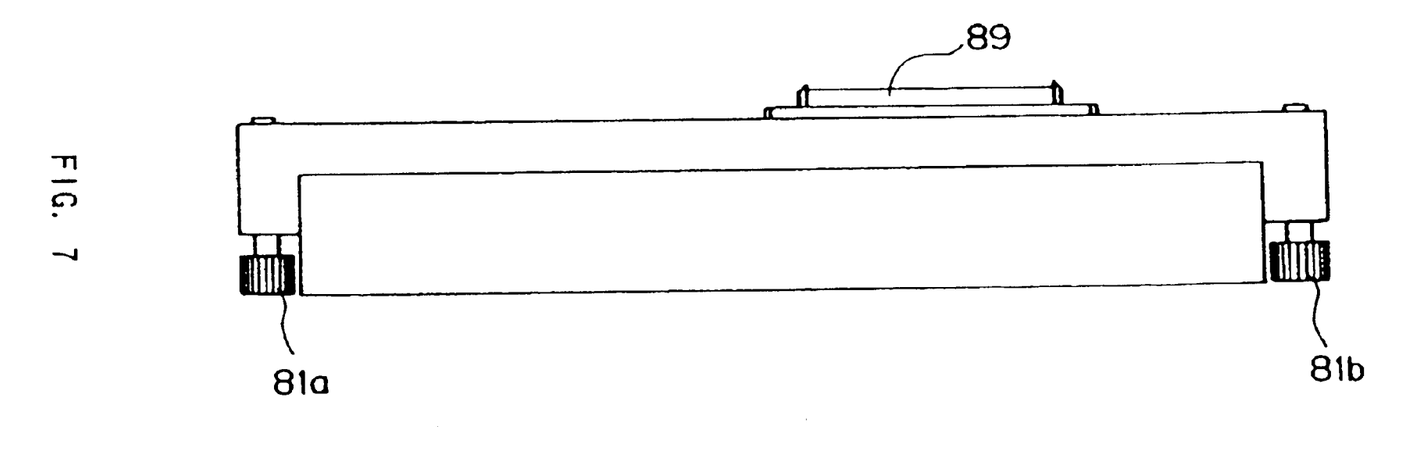
FIG. 7 is an upper view of the port replicater shown in FIG. 1.

The port replicater 80 includes, as shown in FIG. 6, a pair of screws 81a and 81b, USB port 82, keyboard or mouse connector 83, multi-bay adapter 84, floppy disc connector 85, CRT connector 86, parallel interface 87, and serial interface 88. Hereupon, FIG. 6 is a rear view of the port replicater. As shown in FIG. 7, the port replicater 80 includes connector 89 to notebook PC 10. Hereupon, FIG. 7 is an upper view of the port replicater 80.

The screws 81a and 81b are used to attach the port replicater 80 to the notebook PC 10. The USB port 82 is used for a USB connection to another electronic hardware. A keyboard or mouse may be connected to the keyboard or mouse connector 83. A printer etc. may be connected to the parallel interface 87. A modem etc. may be connected to the serial interface 88.

The port replicater 80 advantageously includes the multi-bay adapter 84 and the floppy disc connector 85. The multi-bay adapter 84 is formed, for example, as male 64 pins, and connectable to the cable 48 having connector 481 with female 64 pins. The floppy disc connector 85 in the port replicater 80 is formed, for example, as male 26 pins, and connected to a connector (not shown) accommodated in the floppy disc storage part 55 via a cable (not shown) when the expanding unit 70 is a FDD as described later. The storage part 55 has a floppy disc connector inside a lid in FIG. 5. This connector is connected to the floppy disc connector 85 of the port replicater 80 in FIG. 6 through a cable. The bay attachment 50 connects, when thus connected to a FDD as the expanding unit 70 (FIG. 1), the FDD to the notebook PC body 10 via the port replicater 80.

The FDD is connected to the notebook PC body 10 via the port replicater 80 in the embodiment shown in FIGS. 1 and 6, while a connector accommodated in the floppy disc connector storage part 55 (FIG. 5) may be connected to the notebook PC body 10 via a cable without using port replicater 80. According to this structure, the connector corresponding to the floppy disc connector 85 in the port replicater 80 in FIG. 6 is connected to the cable accommodated in the floppy disc connector storage part 55 (FIG. 5) via the cable. The connector corresponding to the floppy disc connector 85 in the port replicater 80 in FIG. 6 may be located at any place in the notebook PC body 10. As an example, it is provided at the rear surface of the notebook PC body 10 (or a part to which the port replicater 80 is connected in FIG. 1).

Figure 5:
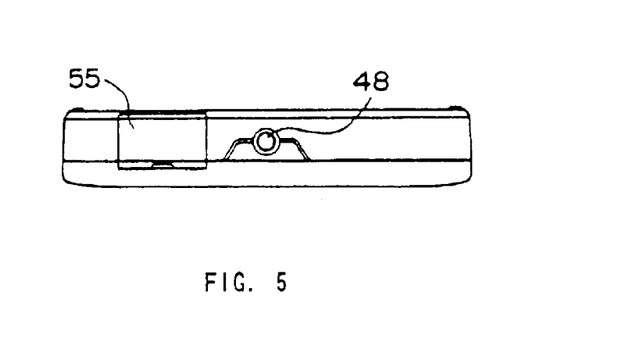
FIG. 5 is a rear view of the bay attachment shown in FIG. 1.

The floppy disc connector stored in the floppy disc connector storage part 55 may be used to simply expand the notebook PC 10 with an external FDD.

The cable 48 has an IDE interface and an analog music interface, as described later. The cable 48 is connected detachably to the port replicater 80, but may be connected detachably to the bay attachment 50. For example, a preparation of a plurality of cables 48 having different lengths would enhance the operability of the computer system 100. The cable 48 spaces the notebook PC 10 from the bay attachment 50, thereby facilitating the miniaturization of the notebook PC 10 in comparison with the notebook PC 10 having an internal bay attachment.

Referring to FIG. 2, the bay attachment 50 includes storage part 51, control part 56, LT-LCD 54, operation part 52, and connector 58. The storage part 51 may detachably store the expanding unit 70. As far as the bay attachment 50 is made connectable to the expanding unit 70, it is not necessary to store the expanding unit in the storage part 51. The storage part S1 is preferable in that it protect the expanding unit 70 from tilt, direct vibration and impact. Although the control part 56, LT-LCD 54 and operation part 52 are schematically shown in FIG. 2, the LT-LCD 54 and the operation part 52 are connected to and controlled by the control part 56.

Figure 3:
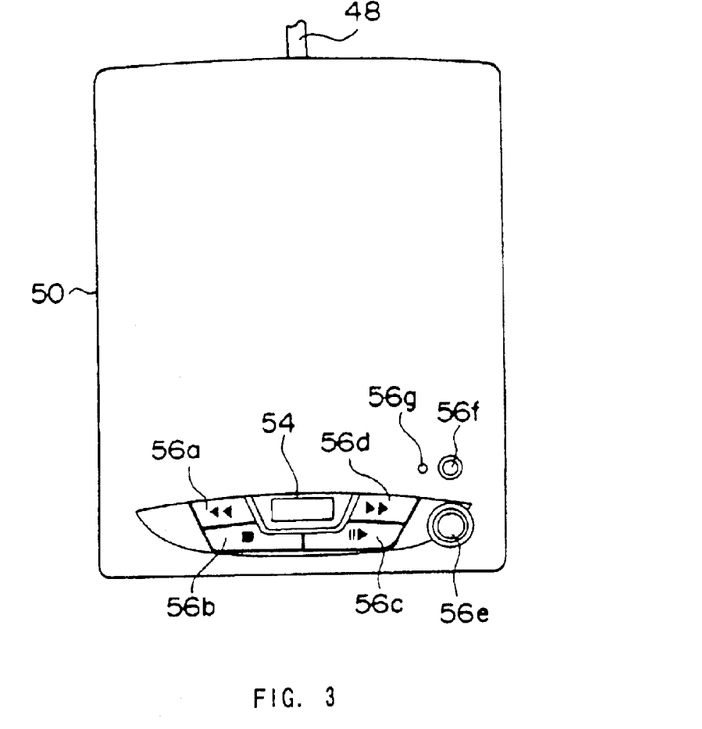
FIG. 3 is an upper view of a bay attachment shown in FIG. 1.

The control part 56 includes, as shown in FIG. 3, rewind (return by one tune) button 56*a*, stop/eject button 56*b*, reproduction/pose button 56*c*, fast-forward (skip by one tune) button 56*d*, power source button 56*e*, unlock button 56*f*, and lamp 56*g*. FIG. 3 is an upper view of the bay attachment 50. The rewind button 56*a* returns music on a music CD by one tune, whereas the fast-forward button 56*d* skips music on a music CD by one tune. The stop/eject button 56*b* stops reproduction of a music CD, and ejects, when pressed twice, a medium in the expanding unit 70, such as a CD-ROM. The reproduction/pose button 56*c* reproduces and temporarily stops the reproduction of a music CD.

The power source button 56*e* is used to power on and off the bay attachment 50 and the extension unit 70 when no application software are activated in the notebook PC 10. When application software runs in the notebook PC 10, the bay controller 24 controls power on and off of them and the power source button 56*e* does not work substantially. Optionally, even in this case, operational information of the power source button 56*e* may be sent as a bay switch information signal to the bay controller 24 so as to reflect it on the application software. The unlock button 56*f* is used to electrically eject the expanding unit 70 from the bay attachment 50 during a process of the expanding unit 70 (such as a reproduction). The lamp 56*g* indicates red during a process of the expanding unit 70 and turns to green when the unlock button 56*f* is pressed. The unlock button 56*f* is convenient, for example, when the expanding unit 70 is replaced from a CD-ROM drive to DVD-ROM drive without turning off the power source. Instead of means for electrically ejecting the expanding unit 70, such as unlock button 56*f*, means for mechanically ejecting the expanding unit 70 from the bay attachment 50 may be provided as floppy disc ejecting means provided in a general-purpose FDD.

Figure 4:
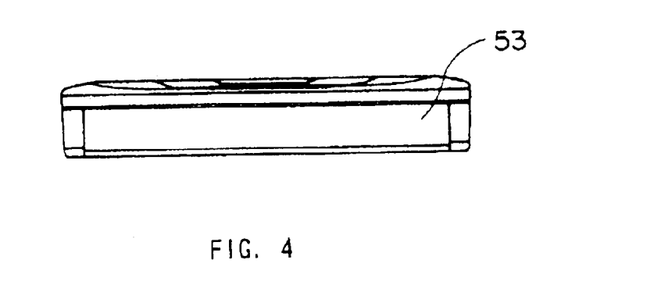
FIG. 4 is a front view of the bay attachment shown in FIG. 1.

As shown in FIG. 4, the bay attachment 50 has front door 53 that is forced in a closing direction by a spring etc. at a front surface thereof. The expanding unit 70 is inserted into the storage part 51 against the spring force through the front door 53. Optionally, the bay attachment 50 may always open at a portion corresponding to the front door 53 without providing the front door 53. As shown in FIG. 5, the bay attachment 50 has floppy disc connector storage part 55 at the rear surface in addition to the cable 48, and a floppy disc connector is provided inside the lid in FIG. 5 of the storage part 55. Hereupon, FIG. 4 is a front view of the bay attachment, while FIG. 5 is a rear view of the bay attachment.

The bay attachment 50 and expanding unit 70 receive power from the notebook PC 10, and are made operable by the power on signal from the bay controller 24. Optionally, the bay attachment 50 and expanding unit 70 may include a unique AC adapter and battery. The bay attachment 50 serves as a charger to the battery pack. The bay attachment 50 has a bay structure, and is connectable compatibly to plural types of expanding units 70 as described later. The bay attachment 50 is connectable to the notebook PC 10 via one cable 48 (or port replicater 80), and has connector 58 in the storage part 51 in the housing that is commonly used for different connectors when a FDD and a CD-ROM drive having these different connectors are used as an expanding unit 70.

The bay attachment 50 in this embodiment is connected to the notebook PC via the port replicater 80, but may be connected to the notebook PC without the port replicater 80. In this case, a member corresponding to the multi-bay adapter 84 shown in FIG. 6 is provided in the notebook PC body 10 and connected to the connector 481 in the bay attachment 50. A member corresponding to the multi-bay adapter 84 may be located at any place in the notebook PC 10 body. As an example, the member corresponding to the multi-bay adapter 84 may be provided in the back of the notebook PC 10 body (or a portion to which the port replicater 80 is connected in FIG. 1).

The expanding unit 70 is selected from a group including, for example, a FDD, a CD-ROM drive, a magneto-optical (MO) disc drive, an LS-120 drive, a digital video disc (DVD-ROM) drive, a HDD, and an AC/DC adapter. Therefore, many devices are applicable to the expanding unit 70 and make the notebook PC 10 multifunctional. The control part 56 may identify which device is inserted into the expanding unit 70. Any identification method may be used. For example, $2^3$=8 identification patterns would be obtained by independently flowing high and low signals through three signal lines. Therefore, eight types of devices as the expanding units 70 may be identified by using such a signal combination.

With reference to FIG. 2, a description will now be given of reproduction of a music CD inserted into expanding unit 70 as a music CD reproducer. FIG. 2 omits the port replicater 80 and cable 48 for illustration purposes. Alternatively, FIG. 2 may be understood as an explanatory view of the bay attachment 50 connected to the notebook PC without port replicater 80.

A description will now be given of a reproduction of a music CD by application software installed in the notebook PC 10. In this case, an operating system (OS) such as Windows 98® that has been stored in the internal HDD 28 is initiated. Then, application software that is operable on such an OS is run. For example, when a music CD is selected by clicking a mouse not shown in FIG. 1 on the application software, the bay controller 24 sends power on signal PON to the bay attachment 50 so as to power it on. The IDE controller 22 instructs, under control by the CPU 12, the control part 56 of the bay attachment 50 to reproduce the music CD via the IDE interface 26.

In response, the control part 56 instructs the expanding unit 70 to reproduce the music CD. The reproduced audio signal is supplied to the amplifier 32 via the music analog interface 36. Hereupon, the amplifier 32 receives the power on signal $P_{ON}$ from the source circuit 30, not from the bay attachment 50. Information on the reproduction time and the order of tunes etc. on the music CD may be indicated on the LT-LCD 54, but usually indicated only on the display of the notebook PC 10. The amplifier 32 transmits the amplified signal to the speaker 34 by amplifying the audio signal. Thereby, the music CD is reproduced from the speaker 34.

A description will now be given of a reproduction of a music CD through an operation of the operation part 52 in the bay attachment 50 where the OS in the notebook PC 10 is initiated. In this case, the bay attachment 50 supplies to the bay controller 24 bay switch information signal BS that informs that the operation part 52 is pressed in the bay attachment 50. The bay switch information signal BS serves to reflect the operation of the operation part 52 on the application software. In other words, it has a similar effect to mouse click selecting a reproduction of the music CD. No reproduction instruction is sent from the IDE controller 32 in this case.

Then, the reproduced audio signal is supplied to the amplifier 32 via the music analog interface 36. Here, the amplifier 32 receives the power on signal $P_{ON}$ from the source circuit 30, not from the bay attachment 50. Information on the reproduction time and the order of tunes etc. on the music CD may be indicated on the LT-LCD 54, but usually indicated only on the display of the notebook PC 10. The amplifier 32 transmits the amplified signal to the speaker 34 by amplifying the audio signal. Thereby, the music CD is reproduced from the speaker 34.

A description will now be given of a reproduction of a music CD through an operation of the operation part 52 in the bay attachment 50 where no power is on (i.e., OS does not run) and the notebook PC 10 is powered on by an AC convenience outlet or battery. In this case, the bay controller 24 and source circuit 30 does not become operable even when the bay attachment 50 supplies to the bay controller 24 the bay switch signal BS that informs that the operation part 52 is pressed in the bay attachment 50. Therefore, the bay switch information signal BS neither substantially work, nor contributes to the reproduction of the music CD except for the amplifier 32 and speaker 34.

In this case, characteristically, the control part 56 in the bay attachment 50 operates independent of the CPU 12, IDE controller 22 and bay controller 24 in the notebook PC 10. The controller 56 transmits the power on signal $_{PON}$ to the amplifier 32 so as to make it operable and the reproduced audio signal to the amplifier 32. Information on the reproduction time and the order of tunes etc. on the music CD may be indicated on the LT-LCD 54. The display on the notebook PC 10 is not power on and thus indicates no information. The amplifier 32 transmits the amplified signal to the speaker 34 by amplifying the audio signal. Thereby, the music CD is reproduced from the speaker 34.

Although the above description exemplifies a CD-ROM drive, the present invention is applicable to a DVD-ROM drive and other expanded devices.

Although the bay attachment 50 uses as a connection part the cable 48 and the connector 481 to be connected to the notebook PC 10 (with or without port replicater 80) in this embodiment, the connection part of this embodiment may cover the direct and indirect connection with the electronic hardware. As described in the embodiment, the bay attachment 50 may be connected to the notebook PC 10 directly or via the port replicater 80. In either structure, the cable 48 and the connector 481 of the present invention each constitute a connection part.

In addition, although this embodiment uses the cable 48 and connector 481, the present invention is not limited to these examples. Without the cable 48, the bay attachment 50 may be connected to the notebook PC as an integrated body. This connection mode is the same as that where a so-called docking station is connected to a portable computer. As explained with reference to FIG. 9, the bay housing 270 may be connected to the portable computer 40. This type of connection would require the operation part to be equipped with an aspect of the bay housing 270, for example.

Although the above examples connect the bay attachment 50 to the notebook PC 10 by the cable 48, connector 481, male 64 pins, female 64 pins etc., the bay attachment 50 may be connected to the notebook PC 10 by a radio format, such as infrared or electromagnetic wave. As an example, the infrared transmitter/receiver module bay attachment 50 may be connected to the notebook PC 10. As an example, the infrared transmitter/receiver module (which includes an infrared LED, a photodiode, and a modulator/demodulator) may be provided with both the bay attachment 50 and the notebook PC 10 so as to secure data communications. The transmitter/receiver may be made by a photodiode and an infrared LED. This type of connection may use, but is not limited to, the infrared data communication standard prescribed by the well-known IrDA (Infrared Data Association). The radio communication is not limited to the above infrared, but may use other electromagnetic waves. The communication does not require a bi-directional communication between the bay attachment 50 and the notebook PC body 10, and may use a uni-directional communication from the bay attachment 50 to the notebook PC body 10. As described, the radio connection constitutes one type of connection in the present invention.

Figure 8:
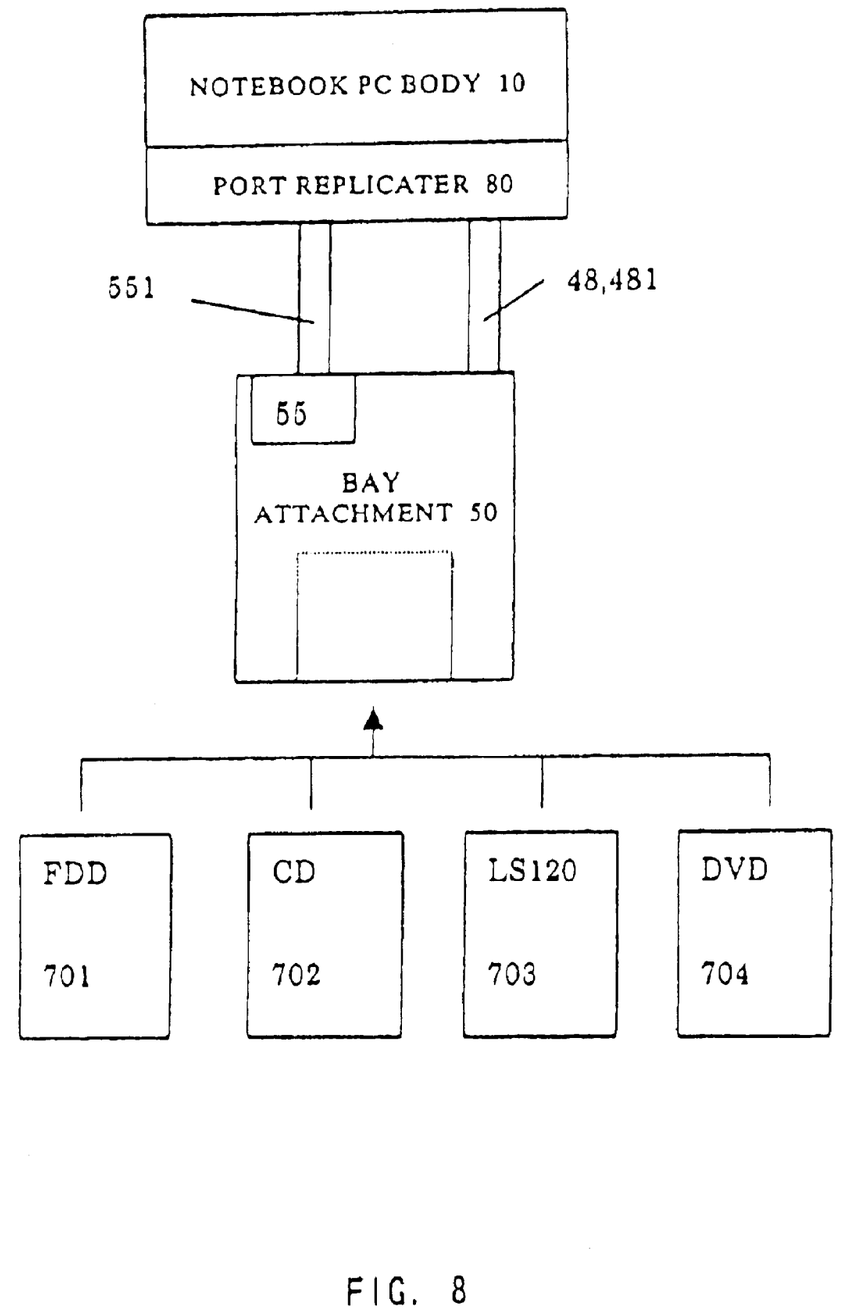
FIG. 8 is another exemplified block diagram of the computer system shown in FIG. 1.

As described above with reference to FIG. 3, the bay attachment 50 includes two connection parts. With reference to FIG. 8, a description will now be given of an embodiment about the notebook PC body 10 whose supplemental function is expanded by providing the CD-ROM drive 702, LS-120 drive 703, DVD-ROM drive 704 in the bay attachment 50 (FIGS. 3 and 8). Those elements in FIG. 8 which are designated by the same reference numerals in other figures denote the same elements. The cable 48 and the connector 481 (FIGS. 3 and 8) each are a connection part which connects the notebook PC body 10 to the bay attachment 50, and include interfaces for the CD-ROM drive 702, LS-120 drive 703, and DVD-ROM drive 704. One of the CD-ROM drive 702, LS-120 drive 703, and DVD-ROM-drive 704 is connected to the bay attachment 50, as described with reference to FIGS. 1 through 7.

The floppy disc drive 701 is connected, as described with reference to FIG. 5, to the notebook PC body 10 via a cable (551 in FIG. 8) and a cable (not shown) stored in the floppy disc connector storage part 55. The storage part 55 stores a connector for a floppy disc inside the lid in FIG. 5. This connector is connected to the floppy disc connector in the port replicater 80 in FIG. 6 via a cable. When the FDD is connected as an expanding unit 70 (FIG. 1) to the bay attachment 50, the floppy disc drive (701 in FIG. 8) is connected to the notebook PC body 10 via the cable 551 (FIG. 8) and the port replicater 80.

Although the port replicater 80 connects the FDD to the notebook PC body 10 in the embodiments shown in FIGS. 1, 6 and 8, the connector stored in the floppy disc connector storage part 55 (FIG. 5) may use the cable 551 (FIG. 8) for connection with the notebook PC body 10 without the port replicater 80. This structure may require the notebook PC body 10 to include a connector corresponding to the floppy disc connector 85 in the port replicater 80 so as to be connectable to the connector stored in the floppy disc connector storage part 55 (FIG. 5) via the cable 551. The connector corresponding to the floppy disc connector 85 in the port replicater 80 may be located at any place in the notebook PC 10. As an example, it may be provided at the rear of the notebook PC body 10 (or a portion to which the port replicater 80 is connected). The connector stored in the floppy disc connector storage part 55 may be used to simply expand the notebook PC 10 with an external FDD.

According to the structure shown in FIG. 8 (or FIGS. 3 and 5), the FDD 701 is connected by the connector 55 and cable 551 which are different interface than the cable 48 and connector 481 as an interface for the CD-ROM drive 702, LS-120 drive 703 and DVD-ROM drive 704 (although the connector at the side of the port replicater is omitted).

For example, suppose there is a unit which uses the cable 48 and connector 481 (FIG. 3) as an interface to enhance a function of the notebook PC body 10 by providing the CD-ROM drive 702, LS-120 drive 703 and DVD-ROM drive 704 in the bay attachment 50 (FIGS. 3 and 8), (although the existence of such a unit is assumed for explanation purposes of the invention and this assumption does not admit that such a unit was known or used at the time of filing of this application.) When a new FDD unit (701) is attempted to be expanded later, this embodiment does not use the cable 48 and connector 481 as an interface for the FDD unit (701). If only one connection part (such as a cable and connector) is used as an interface for a new device (such as the FDD unit 701 in this example), the cable 48 and connector 481 (FIGS. 3 and 8) should be changed in specification or design. Accordingly, as shown in FIGS. 5 and 8, this embodiment provides, as an interface for the newly introduced object, i.e., FDD, another cable 551, connector (stored in the floppy disc connector storage part 55 in FIG. 5), the connector (not shown) of the cable 551 connectable to the foregoing connector, and the connector (not shown) of the cable for connection with the port replicater 80, eliminating the necessary design change of the cable 48 and connector 481.

As described, the present invention eliminates a great design change of the bay attachment and merely adds an interface cable or connector for a newly introduced unit when the newly introduced unit is attempted to the bay attachment 50 for the computer at the subsequent stage. The computer at the subsequent stage is expanded with the newly introduced unit only when the newly introduced unit is connected to the bay attachment 50, without changing the bay attachment 50 and the cable for each additional unit. The reduction of the number of development steps for the entire apparatus and the appropriation of the conventional equipment would contribute to the reduction of the development cost.

Although FIGS. 1, 3 and 8 refer to the cable connecting the bay attachment 50 to the notebook PC 10, a design change of the cable 48 for the newly introduced expanding unit would increase the number of signal lines and thicken the cable. When the cable becomes thick, the flexuosity of the cable becomes lowered. The low flexuosity would restrict the arrangement of the bay attachment, for example, on a desk, and thus the cable should be relatively long to secure certain flexuosity. On the other hand, the present invention employs another cable as another connection part for use with an interface of the newly introduced expanding unit, and would not thicken the cable or deteriorate its flexuosity. Therefore, no long cable 48 is needed.

The newly introduced cable 551 might be detachable to the bay attachment 50. FIGS. 3 and 5 illustrate that the connector that is connectable to the cable 551 is stored in the floppy disc connector storage part 55 (FIG. 5). This structure does not require two cables to be always connected to the bay attachment 50, facilitating an operation of the bay attachment 50. The FDD cable 551 is detachable for users who do not use the FDD, so as to enhancing the portability and other features of the bay attachment 50. A structure that makes the cable 48 detachable may be adopted. One of the objects and effects of the present invention may be achieved by fixing the cable 551 onto the bay attachment 50 as the cable 48 in FIG. 3.

The present invention covers a structure that does not use the cable 48. The connection part of the present invention is not limited to the cables 48 and 551. The present invention covers, for example, a connection structure similar to that between the bay housing 270 and the portable PC 240 in FIG. 9. The connector 95 shown in FIG. 9 may be connected, when the cable 48 is not used, to the connector provided at the lower part in the portable PC 240. The present invention uses, when applied to the structure shown in FIG. 9, the previously provided connector 95 as an interface for the previously provided expanding units. Another and new connector is provided as an interface for the newly introduced expanding unit in the bay housing 270 so as to connect the new expanding unit to the portable PC 240. Another connector part that is connectable to the new connector may be provided, as in the connector 95, at the bottom of the portable PC 240. Even in this case, the reduction of the number of development steps for the entire apparatus and the appropriation of the conventional equipment would contribute to the reduction of the development cost.

The above embodiments refer to the FDD as a new expanding unit for illustrative purposes, and any other device may be used as an expanding unit.

The present invention has been thus discussed in a case where a new expansion FDD is introduced to a device using as an interface the cable 48 and connector 481 so as to expand a function of the notebook PC body 10 by providing the CD-ROM drive 702, LS-120 drive 703 and DVD-ROM drive 704 in the bay attachment 50 (FIGS. 3 and 8). However "a device using as an interface the cable 48 and connector 481 so as to expand a function of the notebook PC body 10 by providing the CD-ROM drive 702, LS-120 drive 703 and DVD-ROM drive 704 in the bay attachment 50" is merely assumed for explanation purposes of the present invention, and this assumption does not admit that such a unit was known or used at the time of filing of this application.

Further, the present invention is not limited to these preferred embodiments, but various variations and modifications may be made without departing from the scope of the present invention.

This application also discloses the following invention. This invention comprises a function expanding device including a first connection part connectable to a unit that expands electronic hardware, a second connection part connectable to the electronic hardware, and a third connection part connectable to said electronic hardware. According to this invention, the second connection part, for example, connects to the hardware the unit that has been conventionally connected to the function expanding device. The third connection part connects to the electronic hardware the unit that is newly designed to be connectable to the electronic hardware. An attempt to connect a newly introduced unit and a conventionally expandable unit to the electronic hardware by one connection part would necessarily alter a conventional connection part to the electronic hardware. In contrast, according to this inventive structure, the third connection part connects the newly introduced unit to the electronic hardware without changing the design of the connection part in the electronic hardware, whereas the second connection part serves as a connection part between the conventionally connectable unit and electronic hardware. It is therefore sufficient to design only the third connection part for the additional unit. The reduction of the number of development steps for the entire apparatus and the appropriation of the conventional equipment would reduce the development cost. Instead, the third connection part may connect the conventionally connectable unit to the electronic hardware while the second connection part may connect to the electronic hardware the newly introduced unit designed to be connected to it. When the unit group is divided into the second and third connection parts, the number of units for each connection part becomes reduced in comparison with that where only one connection part handles all the units. When the connection part is a connector or a cable, the number of signal lines reduces and becomes small. This inventive structure has been described with reference to FIGS. 5, 8 etc.

The function expanding device stated in claim 1 comprises an operation part for a unit that expands a function of electronic hardware, and thus enables the unit to be operated not only by the electronic hardware but also by the function expanding device. Therefore, the function expanding device itself becomes multifunctional.

The function expanding device stated in claim 2 may reproduce a music CD as a unit medium using a function expanding unit without using a control part in the electronic hardware. Therefore, the function expanding device may save labor and power associated with an initiation of application software in electronic hardware, enhancing the operability.

According to the function expanding device stated in claim 3, the operation part may power on at least part of the electronic hardware. For example, when the electronic hardware has an amplifier which amplifies an audio signal of a music CD, the operation part may transmit the power-on signal to the amplifier. Therefore, even when the power-on signal is not supplied to the amplifier after the application in the electronic hardware is run, if power is supplied to the electronic hardware (by an AC adapter or a battery) the control part of the function expanding device may control the amplifier in the electronic hardware.

According to the function expanding device stated in claim 4, the control part may (instruct a related component to) transmit operational information of the operation part to the electronic hardware. Therefore, for example, the operational information of the operation part may reflect on and synchronize with application software in the electronic hardware. Thereby, a similar effect may be obtained by an operation of the operation part in the function expanding device in addition to an operation of the electronic hardware by a mouse click.

According to the function expanding device stated in claim 5, the second connection part is connectable to the electronic hardware via a port replicater.

According to the function expanding device stated in claim 6, the second connection part may have a cable, and the cable spaces the electronic hardware from the function expanding device. Therefore, this electronic hardware may be made light and smaller than the electronic hardware that has been directly connected to the function expanding device. In addition, an arrangement of the function expanding device and the electronic hardware in accordance with a shape of the installation space would enhance the operability.

The function expanding device stated in claim 7 may further comprise a display part which displays a status of the unit, and a user of the function expanding device may confirm the operation. In particular, this function expanding device is suitable when only the control part of the function expanding device controls the unit without using the display part (for example, a LCD) in the electronic hardware.

According to the function expanding device stated in claim 8, the unit may use a plurality of devices, such as a music CD drive, a CD-ROM drive, a DVD-ROM drive, and an LS-120 drive. Therefore, the electronic hardware need not conveniently have a connection part for each unit drive, and may become multifunctional and miniature.

According to the function expanding device stated in claim 9, the second connector may use IDE and music interfaces, and thus the electronic hardware may become multifunctional.

A port replicater stated in claim 10 may connect the above function expanding device to the electronic hardware. More concretely, this port replicater is novel in comparison with a conventional port replicater in having the third connection part connectable to the second connection part.

A function expanding device stated in claim 11 may enable a design of the third connection part for an additional unit. The reduction of the number of development steps for the entire apparatus and the appropriation of the conventional equipment would reduce the development cost. When the unit group is divided into the second and third connection parts, the number of units for each connection part becomes reduced in comparison with that where only one connection part handles all the units. When the connection part is a connector or a cable, the number of signal lines reduces and becomes small.

According to still another aspect of the present invention, as stated in claim 12 or 13, the third connection part connects the newly introduced unit to the electronic hardware without changing the design of the connection part in the electronic hardware, whereas the second connection part serves as a connection part between the conventionally connectable unit and electronic hardware. It is therefore sufficient to design only the third connection part for the additional unit. The reduction of the number of development steps for the entire apparatus and the appropriation of the conventional equipment would reduce the development cost. When the connection part is a connector or a cable, the number of signal lines reduces and each connection part becomes small. More specifically, a smaller connector or thinner cable may be provided.

What is claimed is:

1. A function expanding device comprising:
   a first connection part connectable to a unit which expands a function of electronic hardware;
   a second connection part connectable to the electronic hardware;
   an operation part that enables a user to drive the unit independent of driving the unit by the electronic hardware when the electronic hardware is not running a software application for the unit; and
   a housing forming said first and second connection parts.

2. A function expanding device according to claim 1, further comprising a control part which may control the unit independent of the electronic hardware.

3. A function expanding device according to claim 2, wherein said control part may transmit operational information of the operation part to the electronic hardware.

4. A function expanding device according to claim 1, wherein said operation part may power on at least part of the electronic hardware.

5. A function expanding device according to claim 1, wherein said second connection part is connectable to a port replicator, and connectable to the electronic hardware via the port replicator.

6. A function expanding device according to claim 1, wherein said second connection part has a cable.

7. A function expanding device according to claim 1, further comprising
   a display part which displays a status of the unit.

8. A function expanding device according to claim 1, wherein the unit is selected from a group including a music CD drive, a CD-ROM drive, a DVD-ROM drive, and an LS-120 drive, and said first connection part has a bay structure connectable compatibly to either drive in the group.

9. A function expanding device according to claim 1, wherein said second connector has an IDE interface and a music interface.

10. A port replicator detachably connectable to a function expanding device according to claim 1, comprising:
    a third connection part connectable to the second connection part of the function expanding device; and
    a fourth connection part connectable to the electronic hardware.

11. A function expanding device comprising:
    a first connection part connectable selectively to a plurality of units each of which expands a function of electronic hardware;
    a second connection part connectable to the electronic hardware;
    a third connection part connectable to the electronic hardware, said third connection part being used to connect at least one of said plurality of units to the electronic hardware, and said second connection part being used to connect the rest of said plurality of units to the electronic hardware; and
    a housing forming said first, second and third connection parts.

12. A function expanding device according to claim 11, wherein said second and third connection parts are used to connect to the electronic hardware the unit connectable to the first connection part, but connect different units to the electronic hardware.

13. A function expanding device according to claim 11, wherein said second connection part is used to connect to the electronic hardware at least one of said plurality of units connectable to the first connection part, and
    wherein said third connection part is used to connect to the electronic hardware at least one of the units connectable to the first connection part, which unit is different from the unit connectable by the connection part.

* * * * *

UNITED STATES PATENT AND TRADEMARK OFFICE
CERTIFICATE OF CORRECTION

PATENT NO. : 6,757,165 B2
DATED : June 29, 2004
INVENTOR(S) : Tatsuya Fujiki et al.

It is certified that error appears in the above-identified patent and that said Letters Patent is hereby corrected as shown below:

<u>Column 16,</u>
Line 33, please insert -- second -- before "connection".

Signed and Sealed this

Fourth Day of January, 2005

JON W. DUDAS
*Director of the United States Patent and Trademark Office*